United States Patent
Ardoin

(10) Patent No.: US 10,035,454 B1
(45) Date of Patent: Jul. 31, 2018

(54) BRAKE ALERT ASSEMBLY

(71) Applicant: Richard Ardoin, Friendswood, TX (US)

(72) Inventor: Richard Ardoin, Friendswood, TX (US)

(*) Notice: Subject to any disclaimer, the term of this patent is extended or adjusted under 35 U.S.C. 154(b) by 0 days.

(21) Appl. No.: 15/451,971

(22) Filed: Mar. 7, 2017

(51) Int. Cl.
  *B60Q 1/44* (2006.01)
  *B60Q 1/26* (2006.01)
  *B60R 13/00* (2006.01)
  *B60R 16/02* (2006.01)

(52) U.S. Cl.
  CPC ............ *B60Q 1/44* (2013.01); *B60Q 1/2696* (2013.01); *B60R 13/00* (2013.01); *B60R 16/0207* (2013.01); *B60Y 2400/405* (2013.01)

(58) Field of Classification Search
  CPC .... B60Q 1/44; B60Q 1/2696; B60R 16/0207; B60R 13/00; B60Y 2400/405
  USPC ............... 340/479, 474, 475, 476, 478, 462; 362/485; 446/175, 353
  See application file for complete search history.

(56) References Cited

U.S. PATENT DOCUMENTS

| | | | |
|---|---|---|---|
| 3,873,086 A | 3/1975 | Lee | |
| 5,324,225 A | 6/1994 | Satoh et al. | |
| 6,197,390 B1 | 3/2001 | LaVite | |
| 6,582,314 B1 * | 6/2003 | Arehart | B60R 13/005 40/209 |
| D586,407 S | 2/2009 | McCann | |
| 8,091,915 B2 | 1/2012 | Campbell et al. | |
| 8,290,176 B1 | 10/2012 | West | |
| 2007/0242471 A1 * | 10/2007 | Campbell | B60D 1/60 362/485 |
| 2012/0057361 A1 * | 3/2012 | Corliss | B60Q 1/2661 362/485 |

FOREIGN PATENT DOCUMENTS

WO    WO2012146939    11/2012

* cited by examiner

*Primary Examiner* — Dhaval Patel

(57) ABSTRACT

A brake alert assembly includes a tube that is slidably inserted into a hitch receiver on a vehicle. A tail unit is movably coupled to the tube and the tail unit is electrically coupled to the vehicle. Moreover, the tail unit is in electrical communication with a brake system of the vehicle. In this way the tail unit is turned on when the brake system is engaged. The tail unit is selectively positioned between an actuated position and a de-actuated position. The tail unit extends downwardly from the tube when the tail unit is in the de-actuated position. The tail unit extends upwardly from the tube when the tail unit is in the actuated position.

8 Claims, 5 Drawing Sheets

BRAKE ALERT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to brake devices and more particularly pertains to a new brake device for alerting motorists when brakes in a vehicle are engaged.

BRIEF SUMMARY OF THE INVENTION

An embodiment of the disclosure meets the needs presented above by generally comprising a tube that is slidably inserted into a hitch receiver on a vehicle. A tail unit is movably coupled to the tube and the tail unit is electrically coupled to the vehicle. Moreover, the tail unit is in electrical communication with a brake system of the vehicle. In this way the tail unit is turned on when the brake system is engaged. The tail unit is selectively positioned between an actuated position and a de-actuated position. The tail unit extends downwardly from the tube when the tail unit is in the de-actuated position. The tail unit is urged to extend upwardly from the tube when the tail unit is in the actuated position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
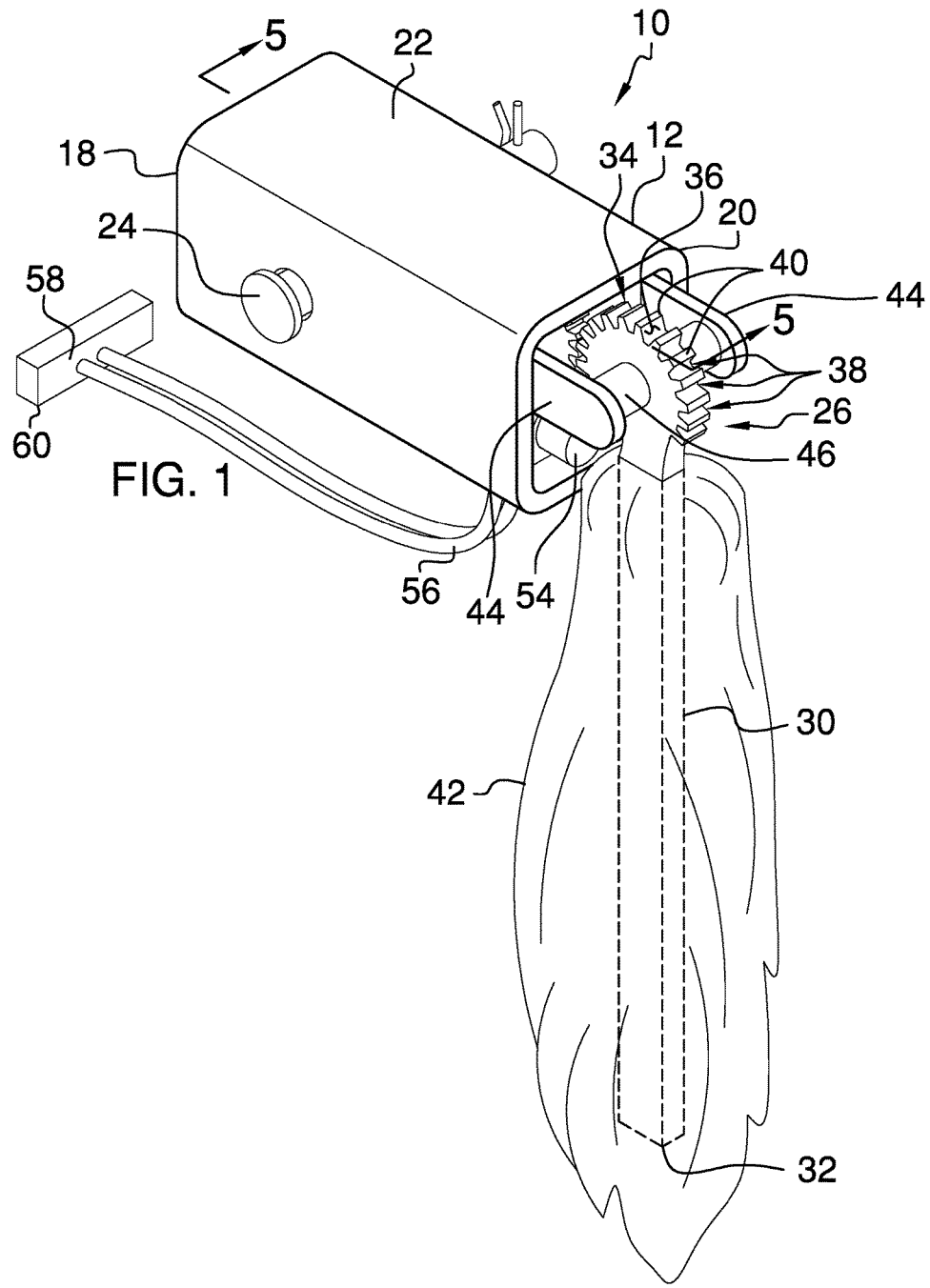
FIG. 1 is a perspective view of a brake alert assembly according to an embodiment of the disclosure.
Figure 2:
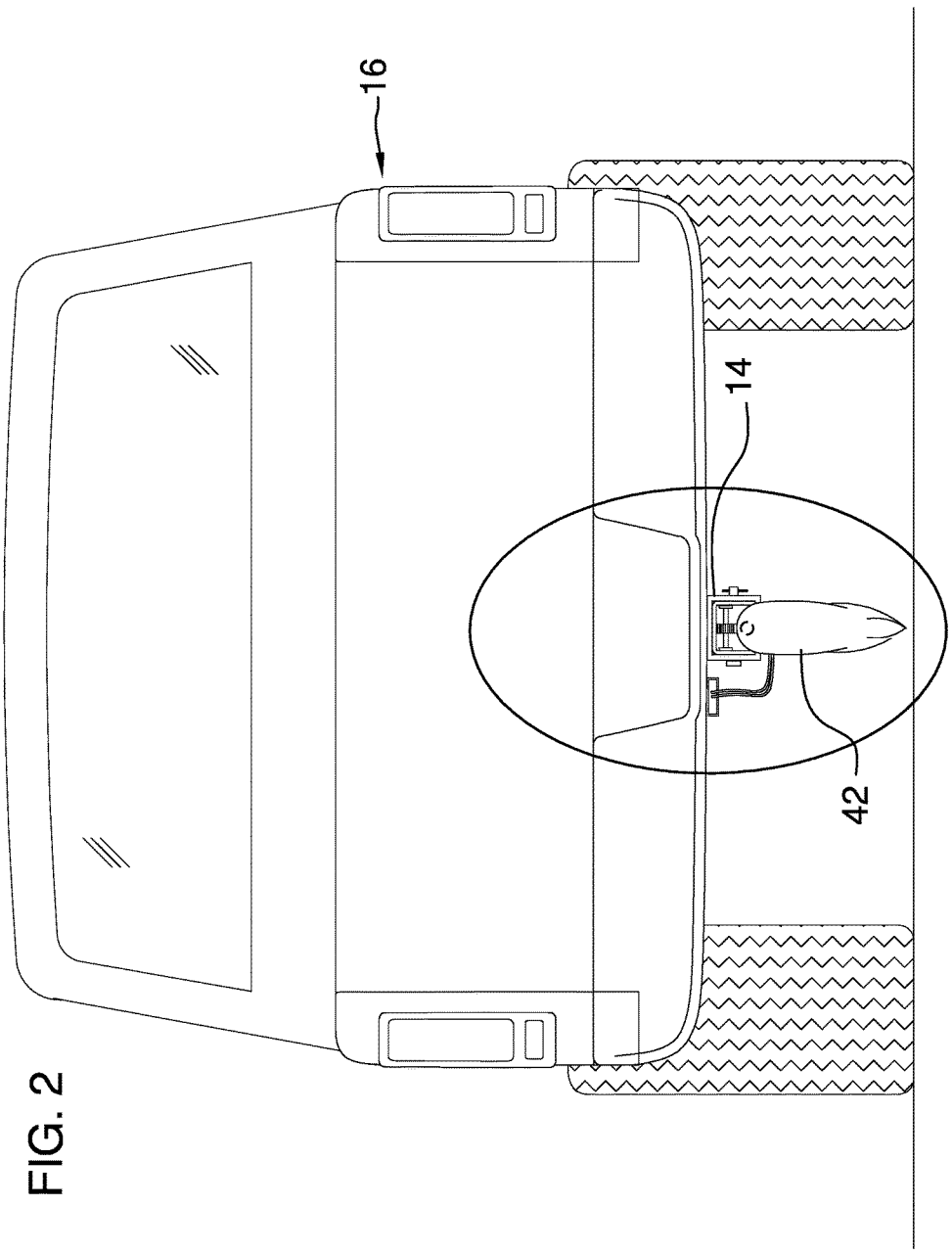
FIG. 2 is a perspective in-use view of an embodiment of the disclosure.
Figure 3:
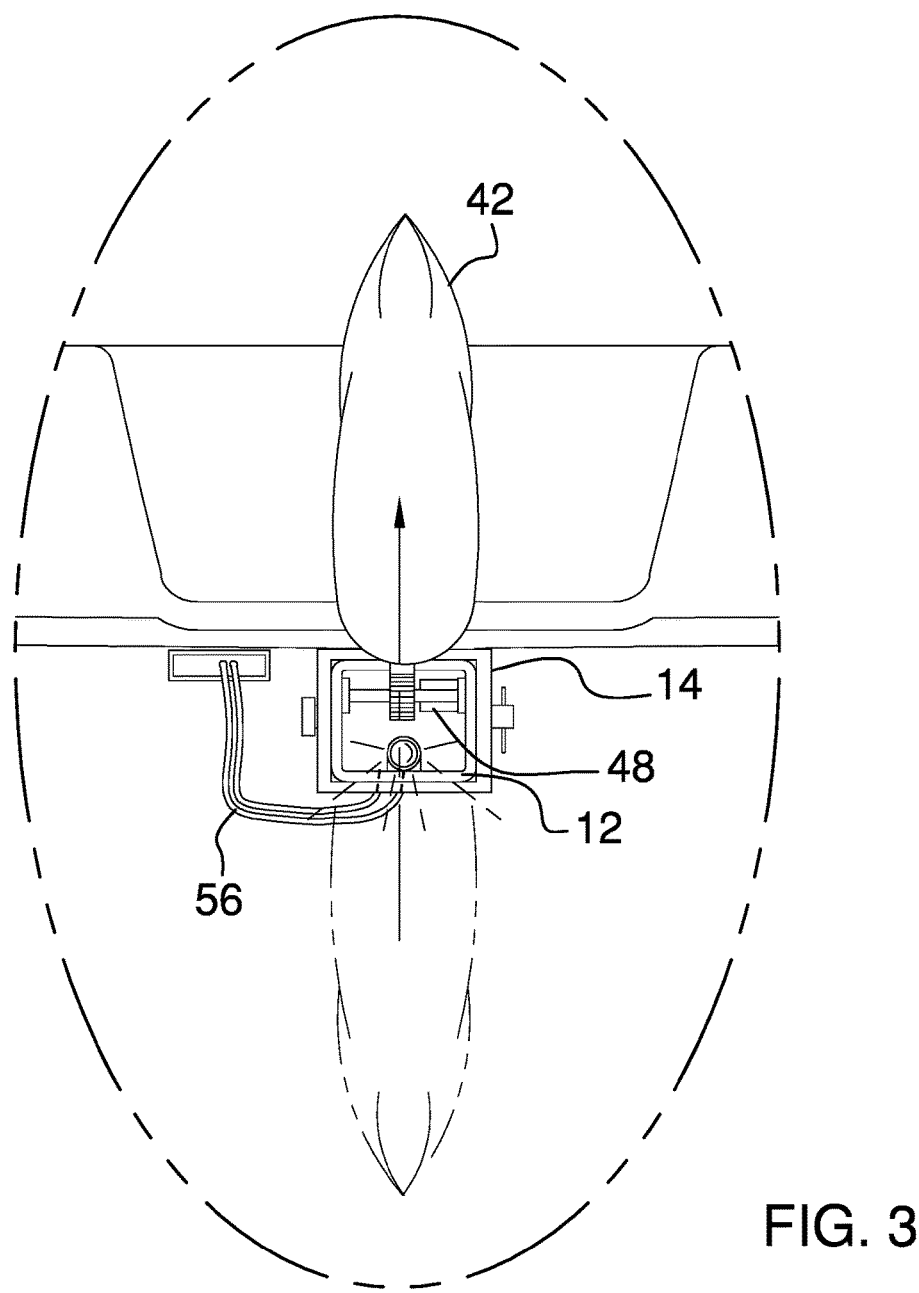
FIG. 3 is a rear perspective view of an embodiment of the disclosure.
Figure 4:
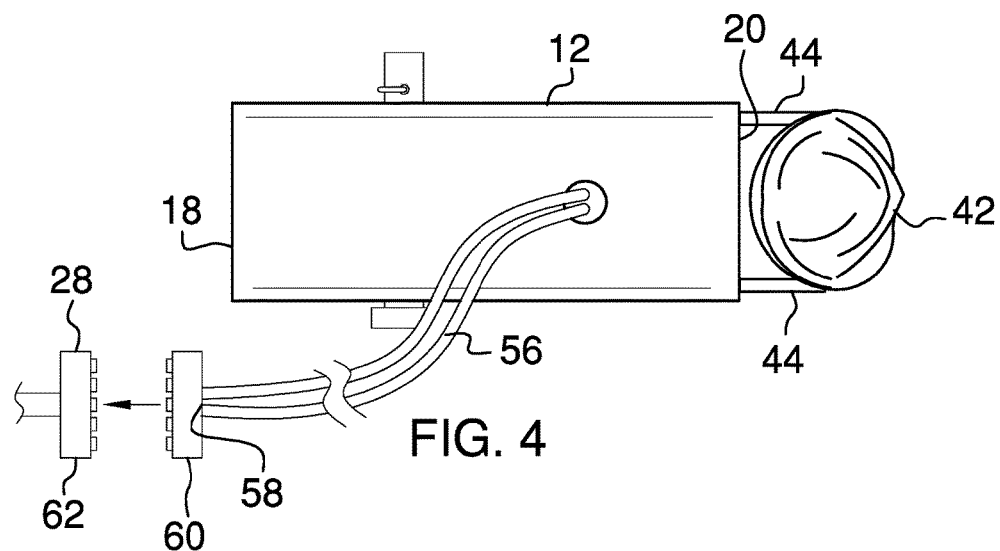
FIG. 4 is a bottom view of an embodiment of the disclosure.
Figure 5:
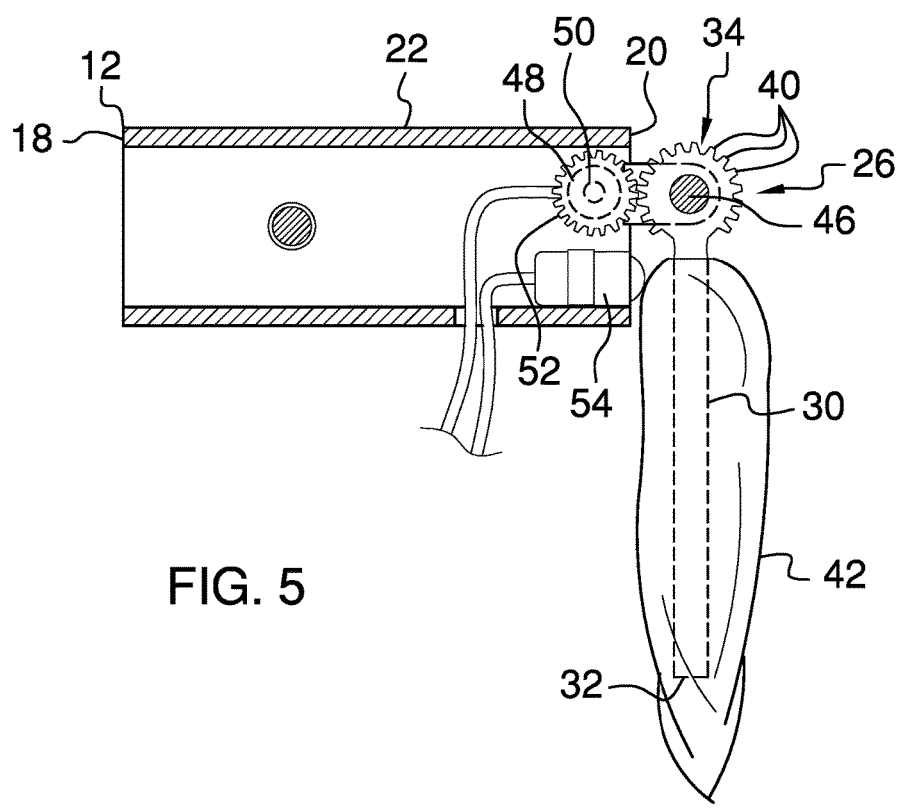
FIG. 5 is a cross sectional view taken along line 5-5 of FIG. 1 of an embodiment of the disclosure showing a tail unit is a de-actuated position.
Figure 6:
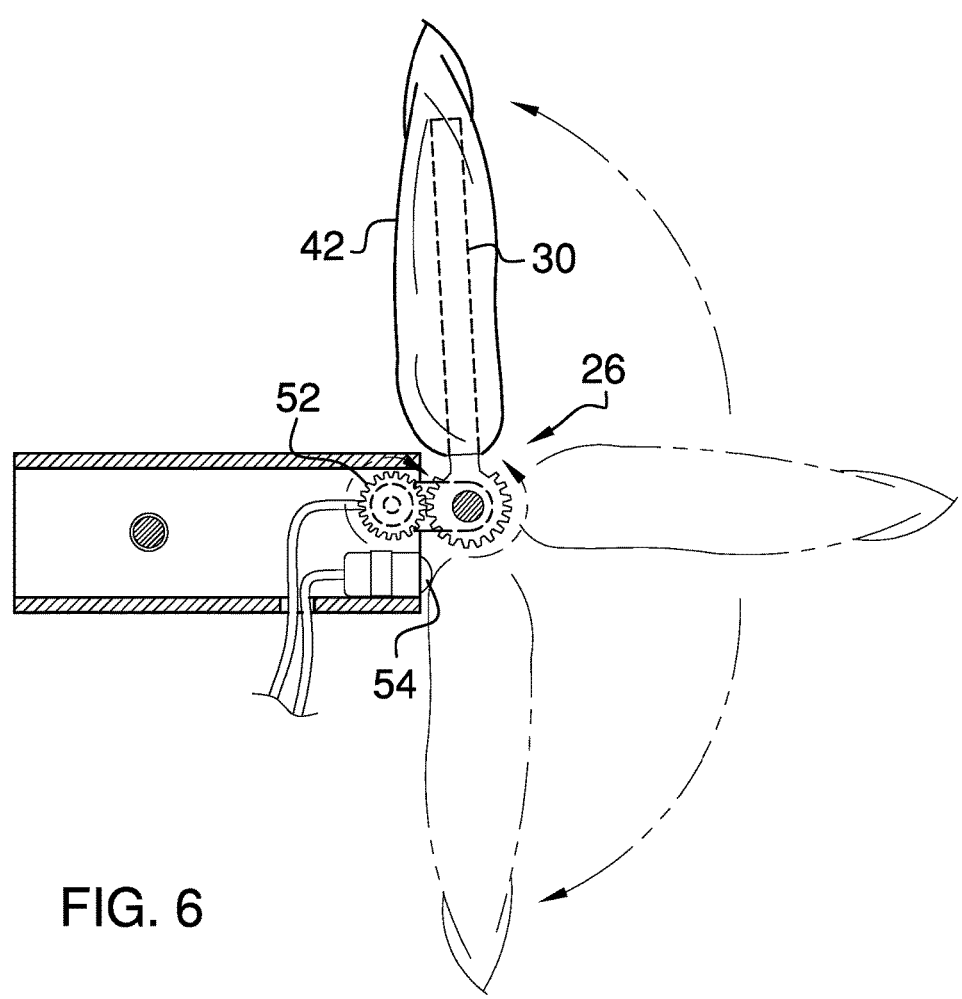
FIG. 6 is a cross sectional view taken along line 5-5 of FIG. 1 of an embodiment of the disclosure showing a tail unit in an actuated position.

With reference now to the drawings, and in particular to FIGS. 1 through 6 thereof, a new brake device embodying the principles and concepts of an embodiment of the disclosure and generally designated by the reference numeral 10 will be described.

As best illustrated in FIGS. 1 through 6, the brake alert assembly 10 generally comprises a tube 12 that is slidably inserted into a hitch receiver 14 on a vehicle 16. The vehicle 16 may be a passenger vehicle, a commercial vehicle or any other vehicle that has a hitch receiver. The tube 12 has a first end 18, a second end 20 and an outer wall 22 extending therebetween. The first end 18 is selectively inserted into the hitch receiver 14 having the tube 12 extending outwardly from the hitch receiver 14. A pinion 24 is selectively extended through the hitch receiver 14 and engages the tube 12 to retain the tube 12 in the hitch receiver 14.

A tail unit 26 is provided and the tail unit 26 is movably coupled to the tube 12. The tail unit 26 is electrically coupled to the vehicle 16 such that the tail unit 26 is in electrical communication with a brake system 28 of the vehicle 16. In this way the tail unit 26 is turned on when the brake system 28 is engaged. Moreover, the tail unit 26 is selectively positioned between an actuated position and a de-actuated position. The tail unit 26 extends downwardly from the tube 12 when the tail unit 26 is in the de-actuated position. The tail unit 26 is urged to extend upwardly from the tube when the tail unit 26 is in the actuated position.

The tail unit 26 comprises a rod 30 that has a primary end 32 and a secondary end 34. The secondary end 34 has an outwardly facing surface 36 and the outwardly facing surface 36 is rounded. The outwardly facing surface 36 has a plurality of indentations 38 to define a plurality of teeth 40. The teeth 40 are spaced apart from each other and are distributed along the outwardly facing surface 36. A tail 42 is provided and the tail 42 is positioned around the rod 30. The tail 42 is structured to have an ornamental appearance of a mammalian tail 42 or the like.

A pair of tabs 44 is provided and each of the tabs 44 is coupled to the outer wall 22 of the tube 12. Each of the tabs 44 extends outwardly from the second end 20 of the tube 12. Moreover, the tabs 44 are spaced apart from each other. A pin 46 extends through the rod 30 and rotatably engaging each of the tabs 44. In this way the rod 30 is movably coupled to the tabs 44 having the rod 30 being spaced from the second end 20 of the tube 12.

A motor 48 is positioned within the tube 12 and the motor 48 may be an electrical motor 48 or the like. A shaft 50 is coupled to the motor 48 such that the motor 48 rotates the shaft 50 when the motor 48 is turned on. A gear 52 is coupled to the shaft 50 such that the shaft 50 rotates the gear 52 when the motor 48 is turned on. The gear 52 engages the teeth 40 on the rod 30. The gear 52 urges the rod 30 to extend upwardly from the tube 12 when the motor 48 is turned on. Additionally, the gear 52 urges the rod 30 to extend downwardly from the tube 12 when the motor 48 is turned off.

A light emitter 54 is provided and the light emitter 54 is coupled to the outer wall 22 of the tube 12 to emit light outwardly from the tube 12. The light emitter 54 is positioned within the tube 12 and is aligned with the second end 20 of the tube 12. Moreover, the light emitter 54 is positioned beneath the gear 52. The light emitter 54 is turned off when the motor 48 is turned off and the light emitter 54 is turned on when the motor 48 is turned on. The light emitter 54 may be an LED or the like and the light emitter 54 may emit red colored light.

A wiring harness 56 is provided and the wiring harness 56 is electrically coupled to each of the motor 48 and the light emitter 54. The wiring harness 56 has a distal end 58 with respect to each of the motor 48 and the light emitter 54. A connector 60 is electrically coupled to the distal end 58 of the wiring harness 56. Moreover, the connector 60 is selectively electrically coupled to a brake light connector 62 on the vehicle 16. In this way each of the motor 48 and the light emitter 54 is in electrical communication with the brake system 28 in the vehicle 16. Each of the motor 48 and the light emitter 54 is turned on when the brake system 28 is engaged. Additionally, each of the motor 48 and the light emitter 54 is turned off when the brake system 28 is not engaged.

In use, the tube 12 is inserted into the hitch receiver 14 and the connector 60 on the wiring harness 56 is electrically coupled to the brake light connector 62. Each of the motor 48 and the light emitter 54 are turned on when the brake system 28 is engaged. Thus, the rod 30 is urged to extend upwardly from the tube 12 and the light emitter 54 emits light. In this way a motorist following the vehicle 16 is alerted that the brake system 28 in the vehicle 16 has been engaged. Each of the motor 48 and the light emitter 54 are turned off when the brake system 28 is not engaged.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A brake alert assembly being configured to communicate that brakes in a vehicle have been applied, said assembly comprising:
    a tube being configured to be slidably inserted into a hitch receiver on a vehicle;
    a tail unit being movably coupled to said tube, said tail unit being configured to be electrically coupled to the vehicle such that said tail unit is in electrical communication with a brake system of the vehicle thereby facilitating said tail unit to be turned on when the brake system is engaged, said tail unit being selectively positioned between an actuated position and a de-actuated position, said tail unit extending downwardly from said tube when said tail unit is in said de-actuated position, said tail unit being urged to extend upwardly from said tube when said tail unit is in said actuated position, said tail unit comprising a rod having a primary end and a secondary end, said secondary end having an outwardly facing surface, said outwardly facing surface being rounded, said outwardly facing surface having a plurality of indentations to define a plurality of teeth, said teeth being spaced apart from each other and being distributed along said outwardly facing surface;
    a tube having a second end;
    a pair of tabs, each of said tabs being coupled to said tube; and
    a pin extending through said rod and rotatably engaging each of said tabs such that said rod is movably coupled to said tabs having said rod being spaced from said second end of said tube.

2. The assembly according to claim 1, wherein:
    said tube has a first end, a second end and an outer wall extending therebetween, said first end being selectively inserted into the hitch receiver having said tube extending outwardly from said hitch receiver; and
    a pair of tabs, each of said tabs being coupled to said outer wall of said tube, each of said tabs extending outwardly from said second end of said tube, said tabs being spaced apart from each other.

3. The assembly according to claim 1, further comprising:
    a motor being positioned within said tube; and
    a shaft being coupled to said motor such that said motor rotates said shaft when said motor is turned on.

4. The assembly according to claim 3, further comprising a gear being coupled to said shaft such that said shaft rotates said gear when said motor is turned on, said gear engaging said teeth on said rod, said gear urging said rod to extend upwardly from said tube when said motor is turned on, said gear urging said rod to extend downwardly from said tube when said motor is turned off.

5. A brake alert assembly being configured to communicate that brakes in a vehicle have been applied, said assembly comprising:
    a tube being configured to be slidably inserted into a hitch receiver on a vehicle, said tube has a first end, a second end and an outer wall extending therebetween, said first end being selectively inserted into the hitch receiver having said tube extending outwardly from said hitch receiver;
    a tail unit being movably coupled to said tube, said tail unit being configured to be electrically coupled to the vehicle such that said tail unit is in electrical communication with a brake system of the vehicle thereby facilitating said tail unit to be turned on when the brake system is engaged, said tail unit being selectively positioned between an actuated position and a de-actuated position, said tail unit extending downwardly from said tube when said tail unit is in said de-actuated position, said tail unit being urged to extend upwardly from said tube when said tail unit is in said actuated position;
a pair of tabs, each of said tabs being coupled to said outer wall of said tube, each of said tabs extending outwardly from said second end of said tube, said tabs being spaced apart from each other;
a gear;
a motor; and
a light emitter being coupled to said outer wall of said tube wherein said light emitter is configured to emit light outwardly from said tube, said light emitter being positioned within said tube and being aligned with said second end of said tube, said light emitter being positioned beneath said gear, said light emitter being turned off when said motor is turned off, said light emitter being turned on when said motor is turned on.

6. The assembly according to claim 5, further comprising a wiring harness being electrically coupled to each of said motor and said light emitter, said wiring harness having a distal end with respect to each of said motor and said light emitter.

7. The assembly according to claim 6, further comprising a connector being electrically coupled to said distal end of said wiring harness wherein said connector is configured to be electrically coupled to a brake light connector on the vehicle thereby facilitating each of said motor and said light emitter to be in electrical communication with the brake system in the vehicle, each of said motor and said light emitter being turned on when the brake system is engaged, each of said motor and said light emitter being turned off when the brake system is not engaged.

8. A brake alert assembly being configured to communicate that brakes in a vehicle have been applied, said assembly comprising:
a tube being configured to be slidably inserted into a hitch receiver on a vehicle, said tube having a first end, a second end and an outer wall extending therebetween, said first end being selectively inserted into the hitch receiver having said tube extending outwardly from said hitch receiver; and
a tail unit being movably coupled to said tube, said tail unit being configured to be electrically coupled to the vehicle such that said tail unit is in electrical communication with a brake system of the vehicle thereby facilitating said tail unit to be turned on when the brake system is engaged, said tail unit being selectively positioned between an actuated position and a de-actuated position, said tail unit extending downwardly from said tube when said tail unit is in said de-actuated position, said tail unit being urged to extend upwardly from said tube when said tail unit is in said actuated position, said tail unit comprising:
a rod having a primary end and a secondary end, said secondary end having an outwardly facing surface, said outwardly facing surface being rounded, said outwardly facing surface having a plurality of indentations to define a plurality of teeth, said teeth being spaced apart from each other and being distributed along said outwardly facing surface,
a pair of tabs, each of said tabs being coupled to said outer wall of said tube, each of said tabs extending outwardly from said second end of said tube, said tabs being spaced apart from each other,
a pin extending through said rod and rotatably engaging each of said tabs such that said rod is movably coupled to said tabs having said rod being spaced from said second end of said tube,
a motor being positioned within said tube,
a shaft being coupled to said motor such that said motor rotates said shaft when said motor is turned on,
a gear being coupled to said shaft such that said shaft rotates said gear when said motor is turned on, said gear engaging said teeth on said rod, said gear urging said rod into to extend upwardly from said tube when said motor is turned on, said gear urging said rod to extend downwardly from said tube when said motor is turned off,
a light emitter being coupled to said outer wall of said tube wherein said light emitter is configured to emit light outwardly from said tube, said light emitter being positioned within said tube and being aligned with said second end of said tube, said light emitter being positioned beneath said gear, said light emitter being turned off when said motor is turned off, said light emitter being turned on when said motor is turned on,
a wiring harness being electrically coupled to each of said motor and said light emitter, said wiring harness having a distal end with respect to each of said motor and said light emitter, and
a connector being electrically coupled to said distal end of said wiring harness wherein said connector is configured to be electrically coupled to a brake light connector on the vehicle thereby facilitating each of said motor and said light emitter to be in electrical communication with the brake system in the vehicle, each of said motor and said light emitter being turned on when the brake system is engaged, each of said motor and said light emitter being turned off when the brake system is not engaged.

* * * * *